United States Patent
Nylander et al.

(10) Patent No.: US 9,467,868 B2
(45) Date of Patent: Oct. 11, 2016

(54) METHOD AND APPARATUS FOR ENABLING ASSIGNMENT OF A GATEWAY TO AN ACCESS NODE

(75) Inventors: Tomas Nylander, Värmdö (SE); Tomas Hedberg, Stockholm (SE); Jari Vikberg, Järna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 135 days.

(21) Appl. No.: 14/347,348

(22) PCT Filed: Sep. 30, 2011

(86) PCT No.: PCT/EP2011/067157
§ 371 (c)(1),
(2), (4) Date: Mar. 26, 2014

(87) PCT Pub. No.: WO2013/044986
PCT Pub. Date: Apr. 4, 2013

(65) Prior Publication Data
US 2014/0233521 A1    Aug. 21, 2014

(51) Int. Cl.
*H04W 4/00* (2009.01)
*H04W 16/18* (2009.01)
(Continued)

(52) U.S. Cl.
CPC ............ *H04W 16/18* (2013.01); *H04W 24/02* (2013.01); *H04W 36/0061* (2013.01); *H04W 84/045* (2013.01); *H04W 88/16* (2013.01)

(58) Field of Classification Search
CPC ... H04W 24/02; H04W 16/18; H04W 72/04; H04W 72/12; H04B 7/2121; H04B 7/2123; H04J 2203/0069; H04Q 2213/394
USPC ........................................ 370/329, 330, 331
See application file for complete search history.

(56) References Cited

U.S. PATENT DOCUMENTS 7,385,947 B2 * 6/2008 Wu ................. H04W 88/08
                                                      370/328
8,538,433 B2 * 9/2013 Kekki .............. H04W 48/17
                                                      370/310
(Continued)

FOREIGN PATENT DOCUMENTS

| WO | 2009129516 A1 | 10/2009 |
| WO | 2010006692 A1 | 1/2010 |
| WO | 2010068154 A1 | 6/2010 |

OTHER PUBLICATIONS

3rd Generation Partnership Project, 3rd Generation Partnership Project; Technical Specification Group Radio Network; Home (e)NodeB; Network aspects (Release 8), Technical Report, 3GPP TR R3.020 v0.9.1, Nov. 1, 2008, pp. 1-68, 3GPP, France.

(Continued)

*Primary Examiner* — Chuong T Ho
(74) *Attorney, Agent, or Firm* — Patents on Demand P.A.; Brian K. Buchheit; Scott M. Garrett (57) ABSTRACT

A method (20) in an access node (4) of a communication system (1) for enabling assignment of a gateway (6) thereto is provided. The communication system (1) comprises a core network node (7) and the access node (4) has one or more neighboring base stations (2, 3). The method (20) comprises acquiring (21) gateway identification information, wherein the gateway identification information identifies a gateway (6) used by a neighboring base station (2, 3) to the access node (4), and transmitting (22) the acquired gateway identification information to the core network node (7), for enabling the core network node (7) to assign the gateway (6) to the access node (4). An access node, methods in a base station, base station, methods in a user equipment and a user equipment are also provided.

28 Claims, 9 Drawing Sheets

(51) Int. Cl.
*H04W 24/02* (2009.01)
*H04W 36/00* (2009.01)
*H04W 84/04* (2009.01)
*H04W 88/16* (2009.01)

(56) References Cited

U.S. PATENT DOCUMENTS

| | | | |
|---|---|---|---|
| 8,855,664 B2* | 10/2014 | Gao | H04W 36/22 370/331 |
| 2005/0148368 A1 | 7/2005 | Scheinert et al. | |
| 2006/0098627 A1* | 5/2006 | Karaoguz | H04L 12/2856 370/352 |
| 2006/0251008 A1* | 11/2006 | Wu | H04W 88/08 370/328 |
| 2010/0085920 A1* | 4/2010 | Chari | H04L 12/2856 370/328 |
| 2010/0195621 A1* | 8/2010 | Kekki | H04W 48/17 370/332 |
| 2011/0040855 A1* | 2/2011 | Miklos | H04W 8/08 709/220 |
| 2011/0064054 A1* | 3/2011 | Parsons | H04W 36/0033 370/331 |
| 2011/0244871 A1* | 10/2011 | Mizusawa | H04W 48/17 455/445 |
| 2011/0274086 A1* | 11/2011 | Xu | H04L 63/061 370/331 |
| 2011/0317589 A1* | 12/2011 | Jolma | H04W 40/248 370/255 |
| 2013/0142172 A1* | 6/2013 | Parsons | H04W 36/0033 370/331 |
| 2013/0183980 A1* | 7/2013 | Gao | H04W 36/22 455/437 |
| 2014/0369319 A1* | 12/2014 | Parsons | H04W 36/0033 370/331 |
| 2015/0172980 A1* | 6/2015 | Han | H04W 36/0072 370/331 |
| 2015/0172994 A1* | 6/2015 | Beser | H04L 12/4645 370/329 |

OTHER PUBLICATIONS

3rd Generation Partnership Project, "3rd Generation Partnership Project; Technical Specification Group Services and System Aspects; Telecommunication management; Home Node B (HNB) Operations, Administration, Maintenance and Provisioning (OAM &P); Procedure flows for Type 1 interface HNB to HNB Management System (HMS) (Release 10)", Technical Specification, 3GPP TS 32.583 V10.1.0, Jun. 1, 2011, pp. 1-22, 3GPP, France.

European Communications Stadards Institute, "Universal Mobile Telecommunications System (UMTS); UTRAN architecture for 3G Home Node B (HNB); Stage 2 (3GPP TS 25.467 version 9.2.0 Release 9)", Technical Specification, ETSI TS 125 467 V9.2.0, Apr. 1, 2010, pp. 1-36, ETSI, France.

\* cited by examiner

METHOD AND APPARATUS FOR ENABLING ASSIGNMENT OF A GATEWAY TO AN ACCESS NODE

TECHNICAL FIELD

The technology disclosed herein relates generally to the field of communication systems, and in particular to configuration of network nodes within such communication systems.

BACKGROUND

In a cellular communication network there will always be areas with high amount of traffic, i.e. high concentration of users. In those areas it would be desirable to deploy additional capacity to keep user satisfaction. The added capacity could be provided by adding a base station, e.g. a macro base station, or by deploying access nodes within the coverage area of the existing base station in order to concentrate a capacity boost to a smaller area, in which the capacity is needed. Such access nodes have lower output power and thus cover a smaller area.

Within the cellular communication network, there will typically also be areas with bad coverage for which there is a need for coverage extension, and again, one way to accomplish this is to deploy an access node with low output power to concentrate the coverage boost to a small area.

One argument for choosing access nodes with low output power in the above cases is that the impact on the existing cellular communication network, e.g. the existing macro base station and its coverage area, can be minimized. It is, for example, a smaller area wherein the macro base station may experience interference.

There are various different terms used for the type of network deployments described above, such as Heterogeneous networks (HetNets) and multilayer networks. These low power access nodes could for example comprise pico, micro or femto base stations, and their respective names mainly indicate their output power and thus coverage area.

Today there are typically a few centralized gateways in the cellular communication network that provide end users with access to Internet. With an expected high increase in data traffic and high speed thereof, capacity issues may arise in these centralized gateways. The centralized high capacity gateways are expensive and to include more such centralized gateways is therefore costly. Further, transport networks needed for delivering the data traffic to the base stations for further delivery to end users may also encounter capacity difficulties. However, investments to upgrade infrastructure, such as the transport networks, are high. Further still, end users expect a high performance and the use of centralized gateways may lead to a decrease in the performance e.g. due to increased delay. The risk of increased delay is particularly pertinent in view of the rapidly increasing amount of data traffic.

One alternative is to localize the access to Internet, for example using local IP access (LIPA). To localize access to Internet in an existing network structure may be challenging. It is a desire that an access node, e.g. a low power node in a HetNet, is physically small. It is a further desire to keep the complexity of the access node low. Further, when a high number of access nodes is expected, the deployment and related configurations, with regard to the localized access to Internet, need to be simple in order to reduce installation costs.

SUMMARY

An object is to obviate at least some of the above disadvantages and provide methods and devices for providing an improved gateway solution in communication systems.

The object is according to a first aspect achieved by a method in an access node of a communication system for enabling assignment of a gateway thereto. The communication system comprises a core network node and the access node has one or more neighboring base stations. The method comprises acquiring gateway identification information, wherein the gateway identification information identifies a gateway used by a neighboring base station to the access node; and transmitting the acquired gateway identification information to the core network node, for enabling the core network node to assign the gateway to the access node.

An efficient selection of a suitable gateway for use by an access node, such as a low power node, is provided. The installation and configuration costs can be kept to a minimum by eliminating the need for manual gateway configuration of the access node. One of the local gateways closest to the access node is assigned to the access node, thus providing access to e.g. Internet close to the users. For a HetNet scenario, wherein the access node comprises a low power node and its neighboring base station comprises a macro base station, the user equipment can be handed over between the macro base station and the access node without any change of gateway required. Further, efficient handling of mobility issues is also provided for user equipment moving between the macro cell and the low power cell. In particular, gateways used on the macro cell site may be used also for the user equipment accessing the low power node, and the same gateway can be used when the user equipment moves from the low power cell to the macro cell without tromboning effects.

In an embodiment, the acquiring of gateway identification information comprises transmitting a request for communication channel establishment to a neighboring base station to the access node, and receiving the gateway identification information in a communication channel establishment response.

In another embodiment, the acquiring of gateway identification information comprises acquiring the gateway identification information from the neighboring base station via the core network node.

In still another embodiment, the acquiring of gateway identification information comprises receiving the gateway identification information over an air interface from a base station.

In yet another embodiment, the acquiring of gateway identification information comprises receiving, from a neighboring base station, information about the neighboring base station, the information about the neighboring base station enabling the core network node to assign the gateway to the access node.

In still another embodiment, the acquiring of gateway identification information comprises transmitting, to a user equipment, a request for the gateway identification information, and receiving from the user equipment a report comprising the gateway identification information.

The gateway identification information can thus be acquired in various ways, providing a solution that can be adapted to the particular communication system in question.

The object is according to a second aspect achieved by an access node of a communication system, the communication system comprising a core network node and the access node having one or more neighboring base stations, the access node comprising a controller, an input device and an output device. The access node is arranged to acquire gateway identification information, wherein the gateway identification information identifies a gateway used by a neighboring base station, and to transmit the acquired gateway identification information to the core network node, for enabling the core network node to assign a gateway to the access node.

The object is according to a third aspect achieved by a method in a base station of a communication system for enabling assignment of a gateway to an access node. The method comprises determining gateway identification information identifying a gateway for use by the access node, wherein the gateway identification information identifies a gateway used by the base station, and providing the gateway identification information to the access node.

The object is according to a fourth aspect achieved by a method performed in a user equipment of a communication system for enabling assignment of a gateway to an access node of the communication system, the communication system comprising a core network node and one or more neighboring base stations. The method comprises receiving from the access node a request for gateway identification information, the gateway identification information identifying a gateway used by a neighboring base station to the access node, determining gateway identification information of a gateway used by the neighboring base station to the access node, and transmitting the determined gateway identification information to the access node, for enabling the core network node to assign the gateway to the access node.

The object is according to a fifth aspect achieved by a user equipment of a communication system comprising an access node and a gateway, the user equipment comprising a controller, an input device and an output device, wherein the user equipment is arranged to receive from the access node a request for gateway identification information, the gateway identification information identifying a gateway used by a neighboring base station to the access node, to determine gateway identification information of a gateway used by the neighboring base station to the access node, and to transmit the determined gateway identification information to the access node, for enabling the core network node to assign the gateway to the access node.

Further features and advantages will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the description of embodiments, some additional background is initially provided, in particular a brief overview of Long Term Evolution (LTE). It is noted that although embodiments will be described in relation to LTE, the teachings are applicable for other types of communication systems, e.g. 3G communication systems. Depending on type of communication system, nodes having corresponding functionalities are denoted differently.

Figure 1:
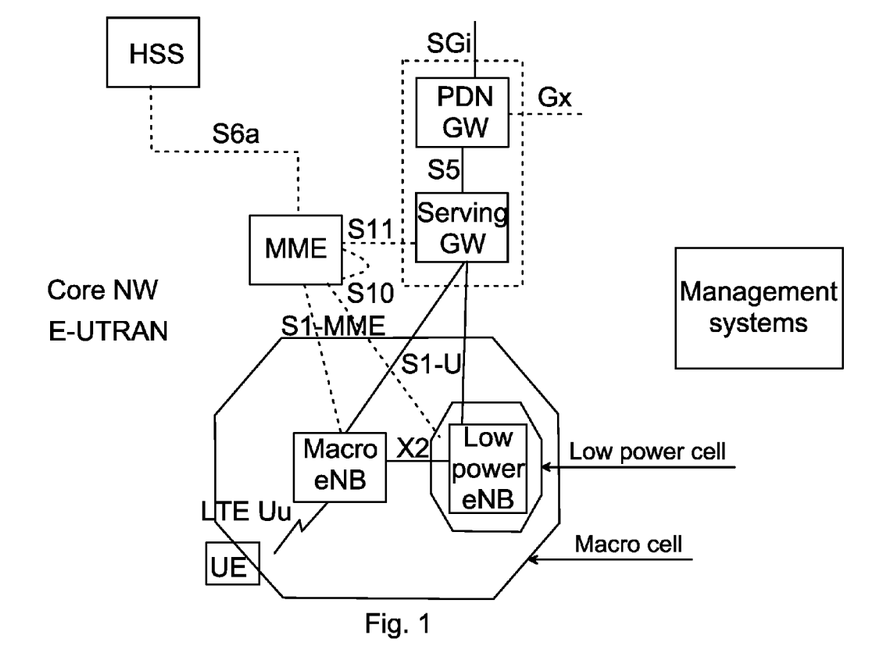
FIG. 1 illustrates a mobile core network and E-UTRAN, more specifically a HetNet example.

FIG. 1 illustrates a mobile core network (Core NW) and evolved UMTS Terrestrial Radio Access Network (E-UTRAN) and in particular a HetNet example. E-UTRAN is the radio access network of 3GPP's Long Term Evolution (LTE) for mobile networks. Another term used for LTE mobile network is the Evolved Packet System (EPS) that consists of Evolved Packet Core (EPC) and the E-UTRAN. Parts of the EPC that are relevant for embodiments described herein comprise a Mobility Management Entity (MME), which handles control functions, a Serving Gateway (SGW) and a Public Data Network Gateway (PDN-GW) that both handle user plane functions. In LTE the base stations are denoted E-UTRAN Node Bs (eNodeBs or eNBs) and S1-MME is the interface/reference point used for control signaling between the eNBs and the MME. An eNB may have S1 links to multiple MMEs for example in case a MME pool concept is used. User plane data goes via the Serving gateway (S-GW) on S1-U interface/reference point. Between the eNBs an X2 interface is used. In the HetNet one of the eNBs is an access node, denoted lower power eNB serving in a low power cell, the coverage of which lies at least partly within the coverage area of another eNB, a macro eNB located in a macro cell. For further details, reference is made to 3GPP TS 23.401, which provides a thorough system architecture description.

Figure 2:
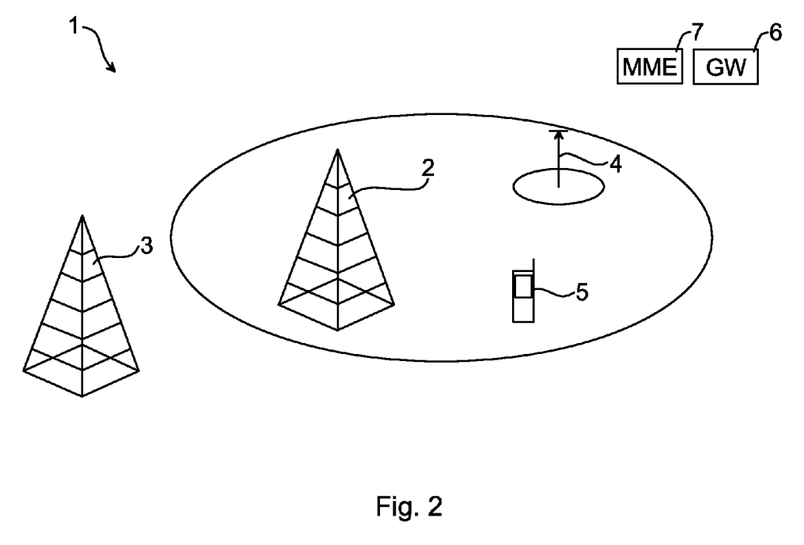
FIG. 2 illustrates schematically an environment in which embodiments may be implemented.

FIG. 2 illustrates schematically an environment in which embodiments may be implemented. A communication system 1 is illustrated comprising a base stations 2, 3, 4 e.g. evolved Node Bs, also denoted eNBs, in LTE, arranged to communicate with user equipment 5 using radio frequency transmitter(s) and receiver(s). In the following, one of the base stations is denoted an access node 4, the other base stations are denoted neighboring base stations 2, 3. The neighboring base stations 2, 3 are neighboring to the access node 4 and may comprise macro base stations, whereas the access node 4 may be a low power node, and in particular an access node 4 that does not comprise a local gateway, or having less gateway functionality than traditional gateways such as Serving Gateway/Public Data Network (S-GW/PDN) or Gateway GPRS Support Node (GGSN). The communication system 1 typically comprises yet further base stations and the base stations each support one or more cells. In case of the access node 4 being a low power node, and its at least one neighboring base station 2, 3 comprises a macro base station, their respective coverage areas are at least partly overlapping. In the following description the access node 4 is sometimes exemplified by a low power node and the neighboring base station 2 with a macro base station, i.e. a HetNet scenario.

The communication system 1 further comprises a core network node 7, for example a mobility management entity as described in relation to FIG. 1.

The communication system 1 also comprises a gateway 6 providing access to Internet, in the LTE case by means of the SGi interface (refer to FIG. 1). The gateway 6 may for example comprise an S-GW/PDN gateway in case of the communication system 1 being a LTE adapted system, or a GGSN in case of a 3G adapted communication system.

Briefly, in an aspect, the neighboring base station 2, 3 comprises information about the local user plane gateway 6 and provides information to the low power node 4 that it has information about a gateway 6 suitable for use by the low power node 4. The low power node 4 can thereby be configured with a gateway in a simple and efficient way, which does not require that a craftsman performs the configuration at site.

The information about a suitable gateway 6, in the following denoted gateway identification information, comprises information for identifying a gateway 6 used by one of the neighboring base stations 2, 3 to the access node 4. The information about a suitable gateway can be conveyed in various ways to the low power node 4, as will be described next.

Figure 3:
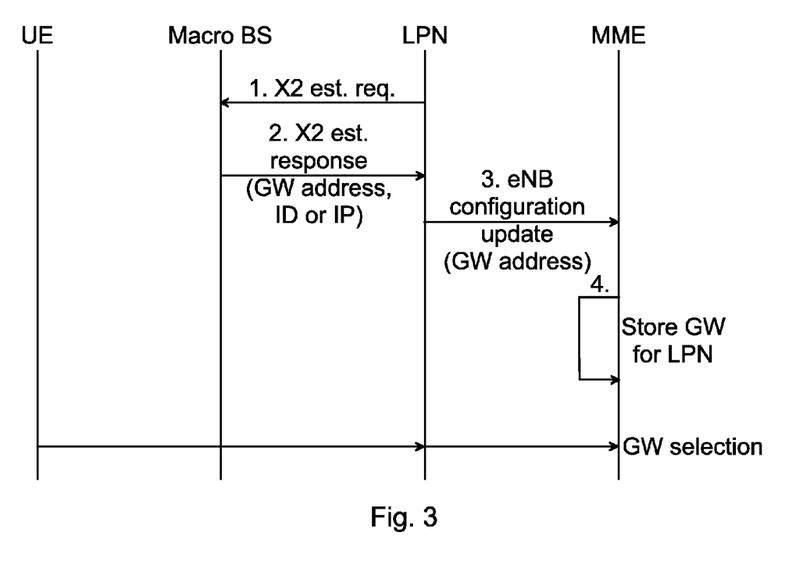
FIG. 3 is a sequence diagram illustrating a first exemplary gateway configuration.

FIG. 3 is a sequence diagram illustrating a first exemplary gateway configuration of the low power node 4. At arrow 1, the low power node 4 transmits an X2 establishment request to the macro base station 2. In an X2 establishment response (arrow 2) from the macro base station 2 to the low power node 4, the gateway identification information is included. The gateway identification information may e.g. comprise a gateway address, a gateway identification or an IP address. Next, at arrow 3, the low power node 4 transmits the gateway identification information to the MME 7, e.g. in a S1 set-up request or configuration update. The MME 7 stores the gateway identification information for the low power node (arrow 4) and the MME 7 is thereby able to assign a gateway to the low power node 4 upon need, e.g. when the user equipment wants access to the Internet (arrows between user equipment 5 and low power node 4 and low power node 4 and the MME 7).

Figure 4:
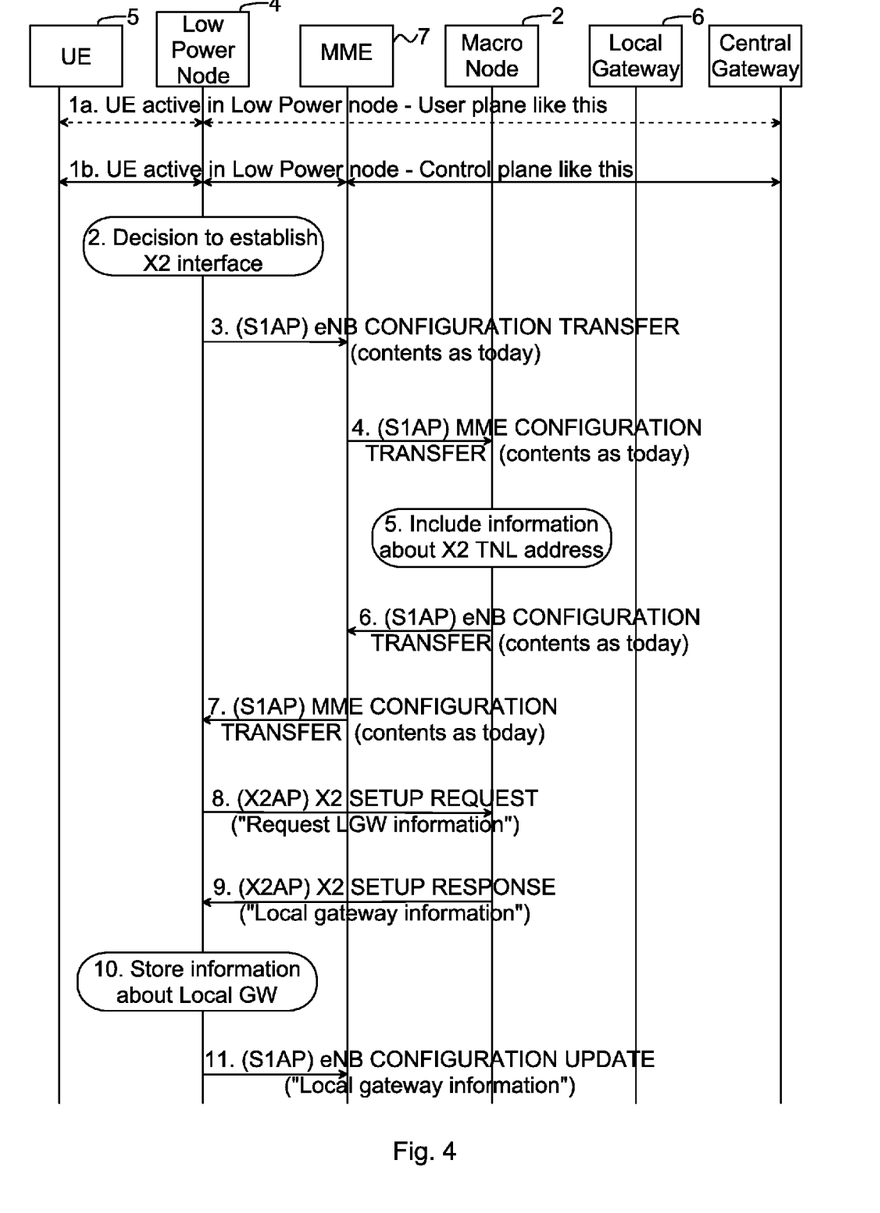
FIG. 4 is a sequence diagram illustrating the gateway configuration of FIG. 3 more in detail.

FIG. 4 is a sequence diagram illustrating the gateway configuration of FIG. 3 more in detail. For completeness of description a typical set up is described at arrows 1a, 1b-7, and in particular showing how the X2 interface can be established. A central gateway, such as a centrally placed combined S-GW and PDN-GW is also involved in this case. At arrows 1a and 1b the user equipment is (becomes) active in the low power node. The low power node 4 makes a decision to establish an X2 interface (box 2), upon which (arrow 3) an eNB configuration transfer is transmitted to the MME 7. The MME 7 in turn transmits a MME configuration transfer to the macro base station 2 (arrow 4), which includes information about X2 TNL address (box 5) and an eNB configuration transfer is then transmitted to the MME 7 (arrow 6). The MME 7 transmits a MME configuration transfer to the low power node 4 (arrow 7). Arrow 8 of FIG. 4 corresponds to arrow 1 of FIG. 3, i.e. the low power node 4 transmits the X2 setup request to the macro base station 2. Arrow 9 corresponds to arrow 2 of FIG. 3, i.e. the X2 setup response is transmitted from the macro base station 2 to the low power node 4. At reference numeral 10, the low power node 4 may store the received information about the suitable gateway, i.e. a local gateway. Arrow 11 corresponds to arrow 3 of FIG. 3, i.e. exemplifies how the low power node 4 can provide the gateway identification information to the MME 7. In particular, the low power node 4 transmits an eNB configuration update comprising the gateway identification information to the MME 7, which is then enabled to assign a gateway to the low power node 4.

From FIGS. 3 and 4 it is thus evident that the gateway identification information can be provided from the macro base station 2 to the low power node 4 when a communication channel is established between them. In the LTE case, this information could be conveyed to the low power node with new information elements when the X2 interface is established, as described.

Another example is an eNB Configuration Update procedure which could be used when the X2 interface is already established and when the macro node 4 is configured with new local gateway information. In this case, the macro base station 2 would send the eNB configuration update message to the low power node 4 including the gateway identification information and the low power node would reply with an eNB configuration update acknowledgement message.

Figure 5:
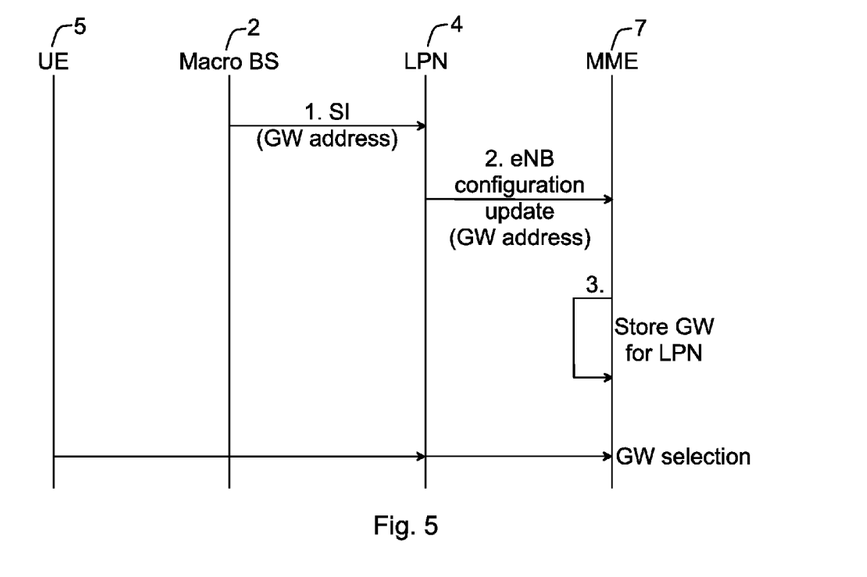
FIG. 5 is a sequence diagram illustrating a second exemplary gateway configuration.

FIG. 5 is a sequence diagram illustrating another exemplary gateway configuration of the low power node 4. In particular, the macro base station 2 can include information about the gateway identification information in system information that is broadcast, (arrow 1) and the low power node 4. The low power node 4 is provided with a user equipment receiver, and is able to read this gateway identification information from the broadcast system information. At arrow 2, the low power node 4 transmits the gateway identification information to the MME 7 e.g. in a S1 set-up request or configuration update, whereupon the MME 7 stores (arrow 3) the gateway identification information for being able to assign the identified gateway 6 to the low power node 4 upon need, e.g. when the user equipment wants access to the Internet (arrows between user equipment 5 and low power node 4 and low power node 4 and the MME 7).

Figure 6:
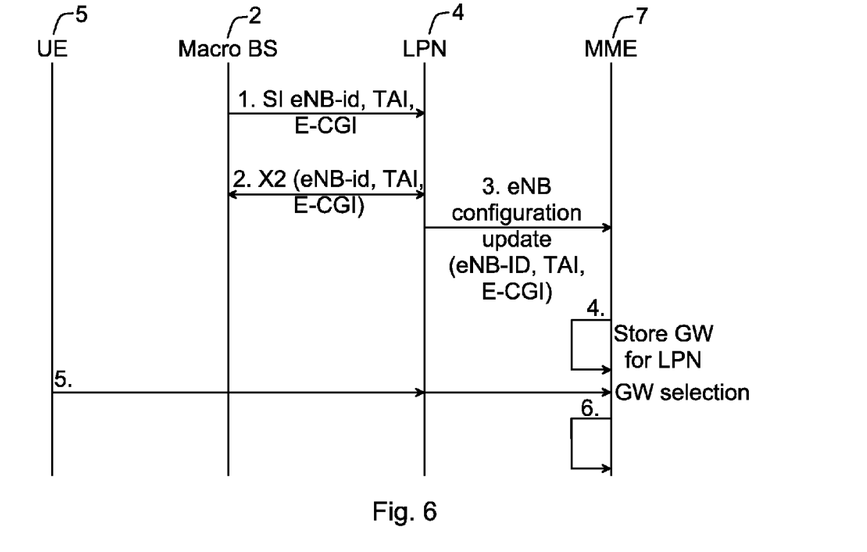
FIG. 6 is a sequence diagram illustrating another exemplary gateway configuration.

FIG. 6 is a sequence diagram illustrating another exemplary gateway configuration of the low power node 4. In this embodiment, the low power node 4 is again provided with a user equipment receiver and is aware of the macro base station 2 identity, for example as identified by eNB-ID, tracking area identity (TAI) or E-UTRAN Cell Global Identifier (E-CGI). The low power node 4 can read such information identifying the macro base station 2 e.g. from system information that the macro base station 2 broadcasts. At arrow 1 thus, the low power node 4 receives macro base station identifying information broadcast by the macro base station 2. Arrow 2, illustrates an optional X2 establishment, in which the low power node 4 and the macro base station 2 performs X2 establishment communication. At arrow 3, the low power node 4 transmits an S1 set-up request to the MME 7, including information identifying the macro base station 2 (e.g. eNB-ID, TAI, E-CGI). The MME 7 comprises logic enabling it to select the local gateway based on the macro node identifying information, and the MME 7 stores (arrow 4) this gateway information. Upon need (arrow 5) to provide e.g. Internet access to a user equipment, the MME 7 may comprise e.g. a table by means of which a gateway address is looked-up based on the macro base station 2 identity (arrow 6).

Figure 7:
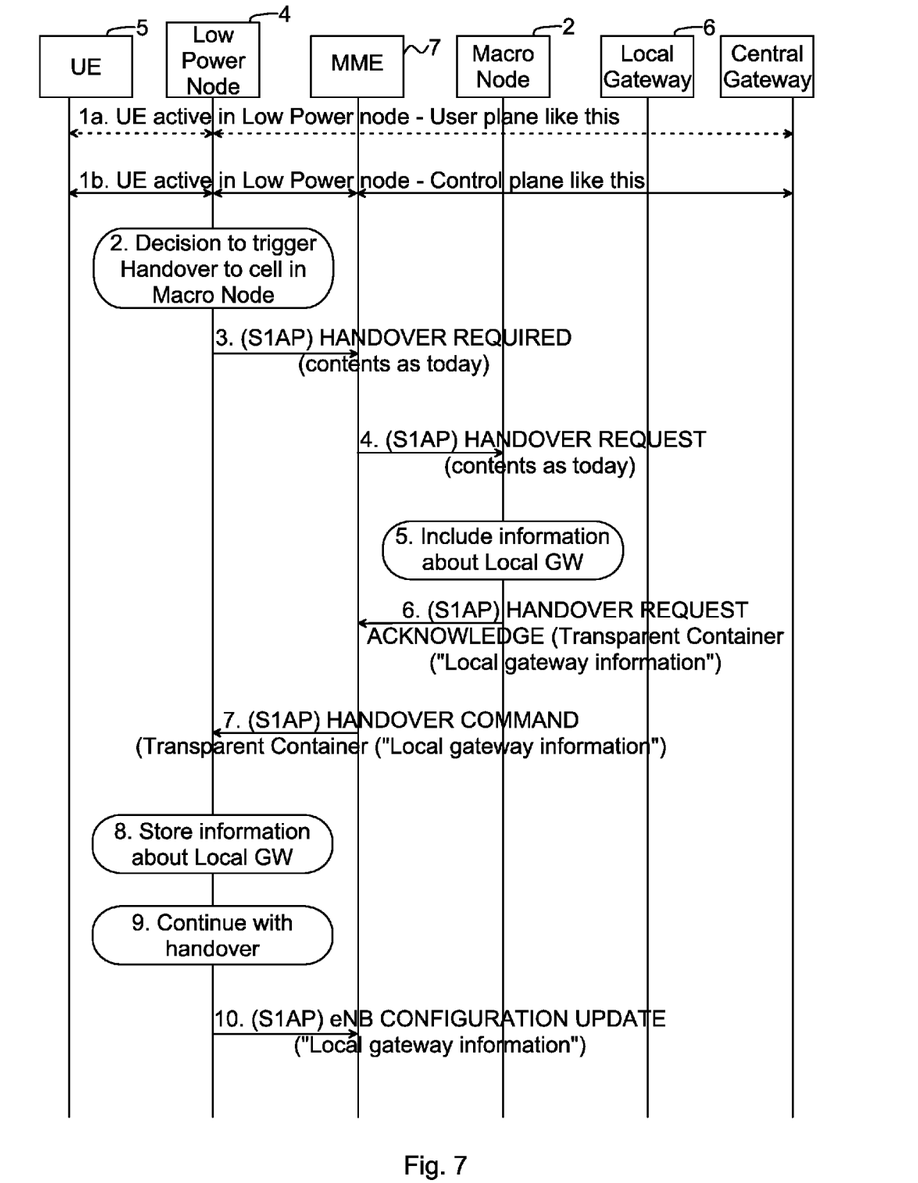
FIG. 7 is a sequence diagram illustrating another exemplary gateway configuration of the low power node.

FIG. 7 is a sequence diagram illustrating another exemplary gateway configuration of the low power node. In this embodiment, the low power node 4 and the macro base station 2 do not (initially) have an X2 interface established. The gateway identification information (i.e. information about local user plane gateway) could be provided from the macro base station 2 to the low power node 4 using signaling via the core network, i.e. the MME 7. The gateway identification information could for example be included in a so called RAN Transparent container as part of a handover preparation phase for handover in either direction (i.e. from the low power node 4 to the macro base station 2 or the reverse direction). FIG. 7 illustrates the case of handover from the low power node 4 to the macro base station 2. At arrows 1a and 1b the user equipment is (becomes) active in the low power node 4. At box 2, a decision to trigger handover to a cell controlled by the macro base station 2 is taken in the low power node 4. At arrow 3, a handover request message is transmitted from the low power node 4 to the MME 7. The MME in turn transmits the handover request (arrow 4) to the macro base station 2. The macro base station 2 includes (box 5) the gateway identification information and transmits this in a handover request acknowledgement (arrow 6) to the MME 7. The MME 7 then transmits a handover command to the low power node 4 in a transparent container (arrow 7). At box 8, the low power node 4 stores the gateway identification information and continues (box 9) with the handover procedure. At arrow 10 an eNB configuration update is transmitted from the low power node 4 to the MME 7, the update including the gateway identification information.

Figure 8:
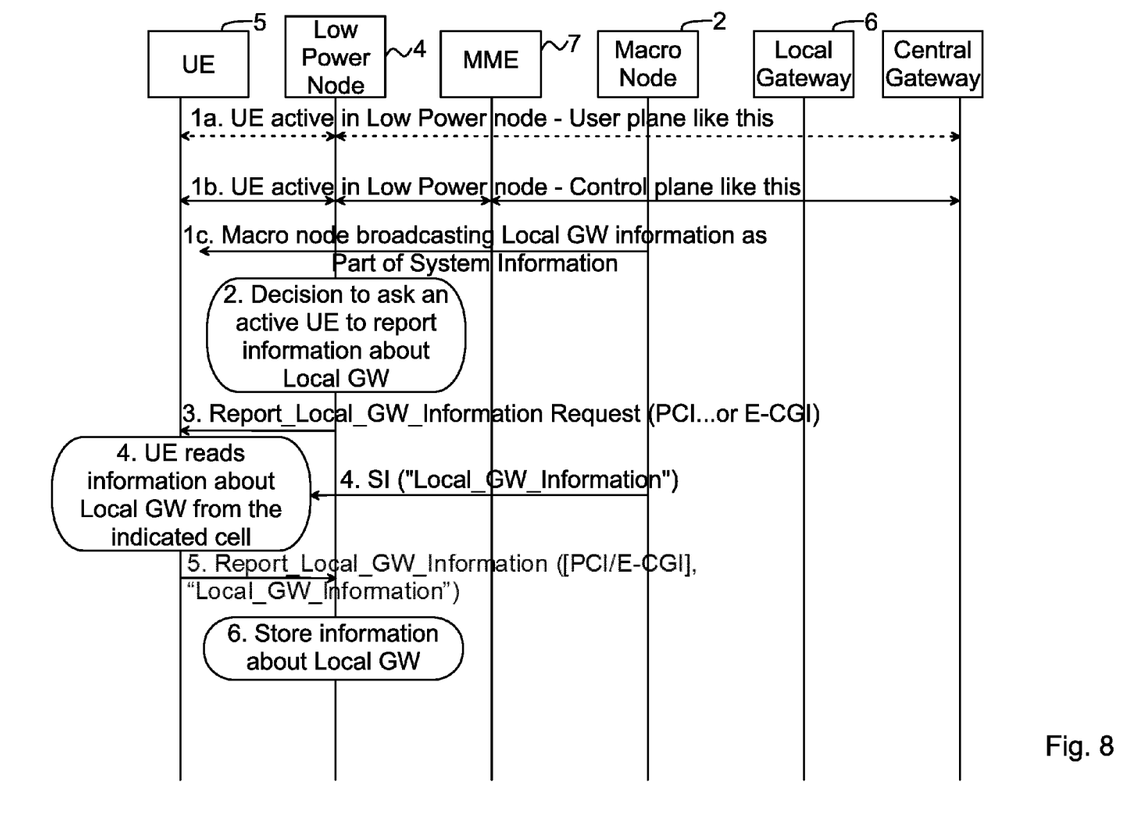
FIG. 8 is a sequence diagram illustrating another exemplary gateway configuration.

FIG. 8 is a sequence diagram illustrating another exemplary gateway configuration. This is a variation of the exemplary gateway configuration described in relation to FIG. 5, but in this case the low power node 4 does not comprise a user equipment receiver. At arrows 1a and 1b the user equipment is (becomes) active in the low power node. Instead of the low power node 4 being provided with a user equipment receiver, the macro base station 2 broadcasts at arrow 1c, gateway identification information. The low power node 4, having no receiver enabling it to read this information, makes a decision (reference numeral 2) to ask an active user equipment to report information about the gateway identification (i.e. about the local gateway to use). The low power node 4 then transmits such a request to an active user equipment (arrow 3). The active user equipment is a user equipment communicating with the access node 4. The active user equipment reads information about the gateway identification as broadcast (reference numeral 4 and arrow 4) and reports (arrow 5) the gateway identification information to the low power node 4. The low power node 4 then stores this gateway identification information (box 6), which can be conveyed to the MME 7 (not illustrated). The low power node 4 may thus periodically ask any user equipment that it is serving to read the gateway identification information broadcast in system information of another cell (e.g. by a cell served by the macro base station 2).

Figure 9:
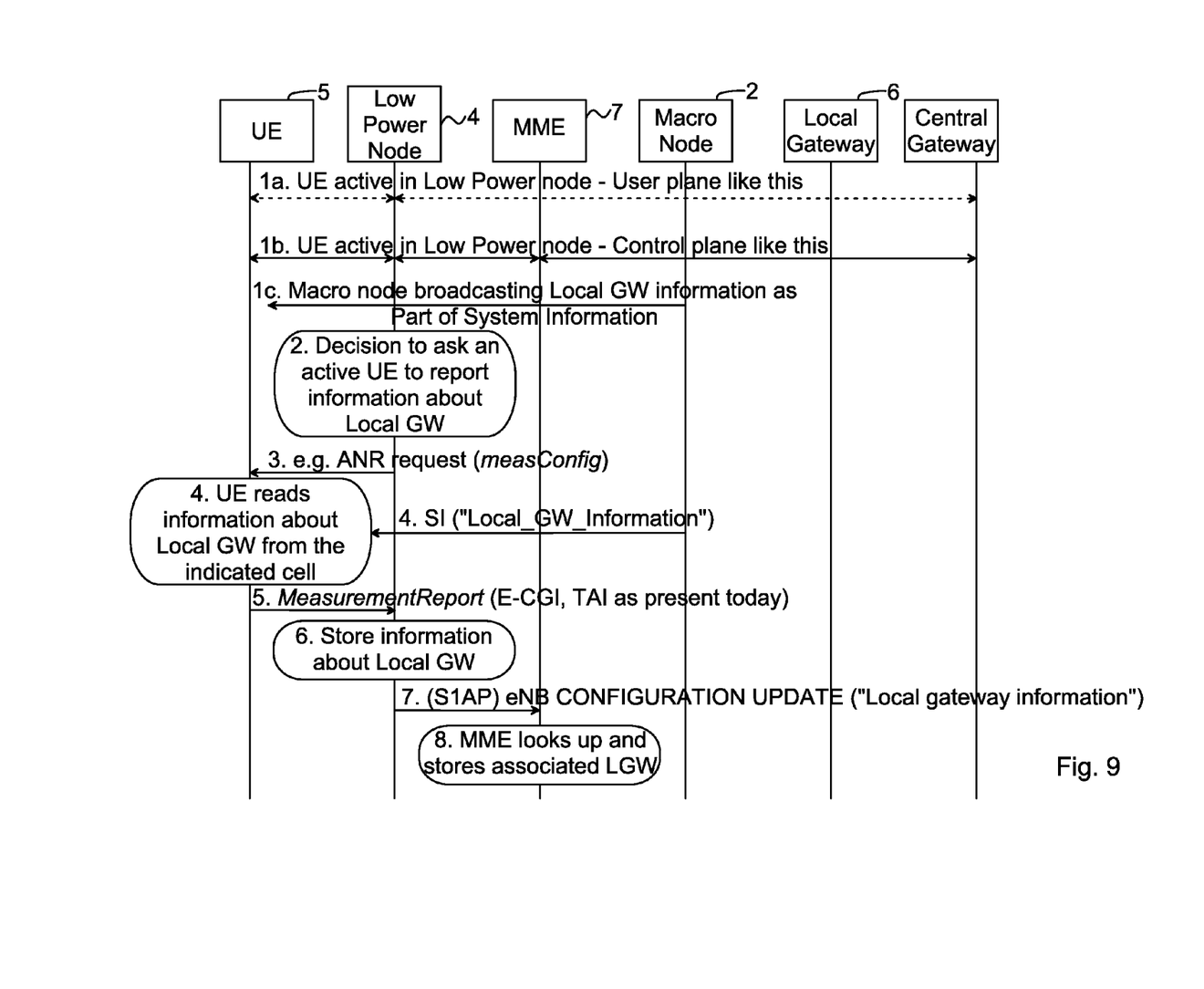
FIG. 9 is a sequence diagram illustrating another exemplary gateway configuration.

FIG. 9 is a sequence diagram illustrating another exemplary gateway configuration. This is a variation of the exemplary gateway configuration described in relation to FIG. 8. In this case, messages used in an Automatic Neighbor Relation (ANR) procedure can be used between the low power node 4 and the user equipment for retrieving information about the macro base station 2 identity (e.g. eNB, TAI or E-CGI). At arrows 1a and 1b the user equipment is (becomes) active in the low power node. At arrow 1c, the macro base station 2 broadcasts gateway identification information as part of system information. The low power node 4, having no receiver able to read this information, makes a decision (reference numeral 2) to ask an active user equipment to report information about the gateway identification (i.e. about the local gateway to use). At arrow 3, e.g. an ANR request is transmitted from the low power node 4 to an active user equipment. The user equipment reads information about gateway identification from a cell indicated in the request (reference numeral 4). The user equipment then transmits to the low power node 4 (arrow 5) the requested measurement report containing e.g. E-CGI, TAI and the local gateway information that is also broadcast by the macro base station 2. The low power node 4 then stores (reference numeral 6) the received information about the gateway identification and transmits this gateway identification information to the MME 7 (arrow 7). The MME 7 then looks up the gateway to use by means of e.g. a table in which the gateway associated with the received information is stored (box 8).

From FIGS. 8 and 9 it is thus evident that the low power node 4 can rely on user equipment that are being served by the low power node 4 to report additional needed information from surrounding cells, information used for enabling the assignment of a gateway to the low power node 4.

Figure 10:
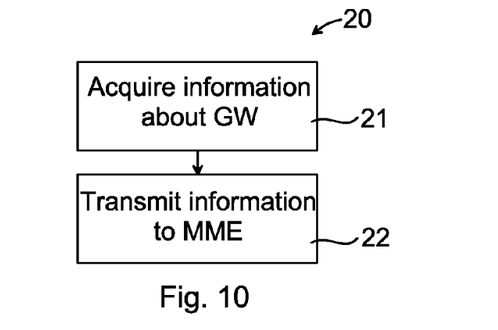
FIG. 10 illustrates a flow chart over steps of an embodiment of a method.

FIG. 10 illustrates steps of a method in accordance with an aspect. The method 20 may be implemented in the access node 4 of the communication system 1 for enabling a gateway 6 to be assigned thereto. As described earlier, the communication system 1 comprises a core network node 7, e.g. the MME, and the access node 4 (exemplified by the low power node) has one or more neighboring base stations 2, 3. The method 20 comprises a step of acquiring 21 gateway identification information, wherein the gateway identification information identifies a gateway 6 used by one of the neighboring base stations 2, 3 to the access node 4. The method 20 comprises another step of transmitting 22 the acquired gateway identification information to the core network node 7. The core network node 7 is thereby able to assign the gateway 6 to the access node 4.

The gateway identification information may be acquired in various ways, which has been described earlier in relation to FIGS. 3-10 and which will be described also in the following. Embodiments of the method 20 will thus be described in the following.

In an embodiment, the acquiring 21 of gateway identification information comprises transmitting, from the access node 4, a request for communication channel establishment to a neighboring base station 2, 3 (neighboring to the access node 4), and receiving the gateway identification information in a communication channel establishment response (refer also to FIGS. 3 and 4 and related description). In a variation of this embodiment, gateway identification information is conveyed in the reverse direction, i.e. when the X2 interface is established from the macro base station 2, 3 towards the access node 4.

In another embodiment, the acquiring 21 of gateway identification information comprises acquiring the gateway identification information from the neighboring base station 2, 3 via the core network node 7 (refer also to FIG. 7 and related description).

In an embodiment, the acquiring 21 of gateway identification information comprises receiving the gateway identification information from the core network node 7 in a radio access network, RAN, transparent container as part of a handover preparation (refer also to FIG. 7 and related description).

In still another embodiment, the acquiring 21 of gateway identification information comprises receiving the gateway identification information over an air interface from the neighboring base station 2, 3 (refer also to FIGS. 5 and 6 and related description).

In an embodiment, the acquiring 21 of gateway identification information comprises receiving, from the neighboring base station 2, 3, information about the neighboring base station 2, 3, the information about the neighboring base station 2, 3 enabling the core network node 7 to assign the gateway 6 to the access node 4. The neighboring base station 2, 3 may transmit implicit identification information for example in the form of an identity of the base station 2, 3, a tracking area identity of the base station 2, 3 and/or an E-UTRAN Cell Global Identifier of the base station 2, 3. This information about the neighboring base station 2, 3 is then conveyed to the core network node 7, which may be arranged to assign, based on the information about the neighboring base station 2, 3, the same gateway to the access node 4 as its neighboring base station 2, 3 uses (refer also to FIGS. 6 and 9 and related description).

In an embodiment, the acquiring 21 of gateway identification information comprises transmitting, to a user equipment 5, a request for the gateway identification information, and receiving from the user equipment 5 a report comprising the gateway identification information (refer also to FIGS. 8 and 9 and related description).

Depending on the way of acquiring the gateway identification information, the gateway identification information may for example comprise a gateway address, a gateway identity, an IP-address of the gateway 6, implicit identification information in the form of an identity of the base station 2, 3, a tracking area identity of the base station 2, 3 and/or an E-UTRAN Cell Global Identifier of the base station 2, 3.

The embodiments of the method may comprise the further step of receiving from the core network node 7 a confirmation message about the assigned gateway 6.

Figure 11:
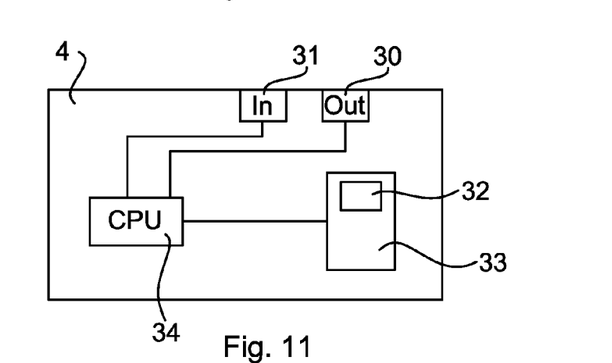
FIG. 11 illustrates an exemplifying low power node suitable for implementing embodiments of the methods.

In an aspect, and with reference to FIG. 11, an access node 4 is also provided. The access node 4 of the communication system 1, the communication system 1 comprising a core network node 7 and the access node 4 having one or more neighboring base stations 2, 3, comprises a controller 34, an input device 31 and an output device 30. The input device 31 and the output device 30 could be separate units or a single unit. The controller 34 may comprise a processor, e.g. a central processing unit, microcontroller, digital signal processor (DSP), etc., capable of executing software instructions stored in a computer program product. The input device 31 may be a receiver, and the output device 30 a transmitter. The access node 4 is arranged to acquire gateway identification information, wherein the gateway identification information identifies a gateway 6 used by a neighboring base station 2, 3. The acquiring of gateway identification information may be performed by the input device 31, for example in response to the controller 34 instructing such acquiring to be performed.

The access node 4 is arranged to transmit the acquired gateway identification information to the core network node 7, for enabling the core network node 7 to assign a gateway 6 to the access node 4. This transmission of the gateway identification information is suitably performed by the output device 30, again for example in response to the controller 34 instructing such transmission to be performed.

In an embodiment, the access node 4 is arranged to acquire the gateway identification information by transmitting a request for communication channel establishment to a neighboring base station 2, 3 of the communication system 1, and receiving the gateway identification information in a communication channel establishment response. The input device 31 and the output device 30, respectively, can be instructed by the controller 34 to perform these steps.

In another embodiment, the access node 4 is arranged to acquire the gateway identification information from the base station 2, 3 via the core network node 7. In an implementation of this embodiment, the access node 4 is arranged to acquire the gateway identification information by receiving the gateway identification information from the core network node 7 in a radio access network, RAN, transparent container as part of a handover preparation (refer also to FIG. 7 and related description). The controller 34 may be arranged to perform and initiate this acquiring of gateway identification information, using the input device 31 and output device 30.

In still another embodiment, the access node 4 is arranged to acquire 21 the gateway identification information by receiving the gateway identification information over an air interface from a base station 2, 3. The input device 31 can thus be arranged to receive the gateway identification information and convey it to the controller 34. In a particular implementation, the access node 4 is provided with a user equipment type of receiver (refer also to FIGS. 5 and 6 and related description).

In another embodiment, the access node 4 is arranged to acquire gateway identification information by receiving, from a neighboring base station 2, 3, information about the neighboring base station 2, 3, the information about the neighboring base station 2, 3 enabling the core network node 7 to assign the gateway 6 to the access node 4 (refer also to FIG. 6 and related description).

In another embodiment, the access node 4 is arranged to acquire the gateway identification information by transmitting to a user equipment 5 a request for gateway identification information, and receiving from the user equipment 5 a report comprising the requested gateway identification information. The controller 34 of the access node 5 may be performed to initiate the acquiring of information, using the input device 51 and output device 50.

In an embodiment, the access node 4 is arranged to receive from the core network node 7 a confirmation message about the assigned gateway 6. Such confirmation message (acknowledgement) may be used for different purposes, e.g. for the access node 4 to store information about the assigned gateway 6.

For the described embodiments of the access node, it is noted that the gateway identification information referred to may comprise a gateway address, a gateway identity, an IP-address of the gateway 6, implicit identification information in the form of an identity of the neighboring base station 2, 3, a tracking area identity of the base station 2, 3 and/or an E-UTRAN Cell Global Identifier of the base station 2, 3.

The access node 4 may comprises a low power node providing access to the communication system 1 for a user equipment 5. The core network node 7 may comprise a mobility management entity (MME) or a Serving General Packet Radio Service (GPRS) Support Node (SGSN).

Figure 12:
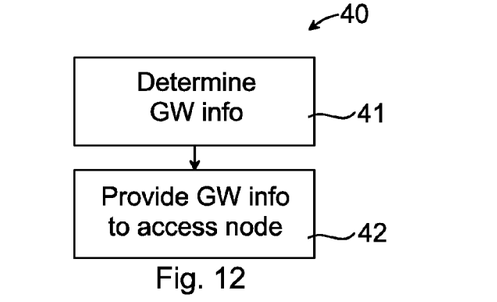
FIG. 12 illustrates a flow chart over steps of an embodiment of a method.

In an aspect, and with reference to FIG. 12, there is also provided a method in a base station 2, 3 of a communication system 1 for enabling a gateway 6 to be assigned to an access node 4. The method 40 comprises determining 41 gateway identification information identifying a gateway 6 for use by the access node 4, wherein the gateway identification information identifies a gateway 6 used by the base station 2, 3. The method 40 further comprises providing 42 the gateway identification information to the access node 4.

In an embodiment, the determining 41 of gateway identification information comprises determining a gateway address, a gateway identity, an IP-address of the gateway 6, implicit identification information in the form of an identity of the base station 2, 3, a tracking area identity of the base station 2, 3 and/or an E-UTRAN Cell Global Identifier of the base station 2, 3.

In an embodiment, the providing 42 of gateway identification information comprises receiving, from the access node 4, a request for the gateway identification information, and transmitting, to the access node 4, a response comprising the requested gateway identification information (refer also to FIG. 3 and related description).

In an embodiment, the gateway identification information is broadcast as part of system information.

Figure 13:
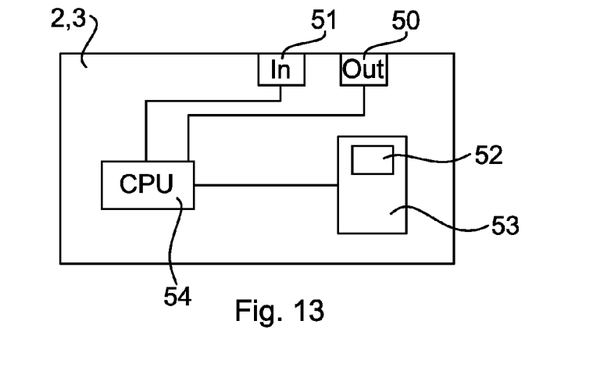
FIG. 13 illustrates an exemplifying base station suitable for implementing embodiments of the methods.

In an aspect, and with reference to FIG. 13, a base station 2, 3 is provided, the base station 2, 3 being part of a communication system comprising an access node 4 and a gateway 6, the base station 2, 3 comprising a controller 54, an input device 51 and an output device 50. Again, it is noted that the input device 51 and the output device 50 could be separate devices or a single device. The controller 54 may comprise a processor, e.g. a central processing unit, microcontroller, digital signal processor (DSP), etc., capable of executing software instructions stored in a computer program product. The base station 2, 3 is arranged to determine gateway identification information identifying a gateway 6 for use by the access node 4, wherein the gateway identification information identifies a gateway 6 used by the base station 2, 3, and to provide the gateway identification information to the access node 4.

In an embodiment, the base station 2, 3 is arranged to determine 41 the gateway identification information transmitting a gateway address, a gateway identity, an IP-address of the gateway 6, implicit identification information in the form of an identity of the neighboring base station 2, 3, a tracking area identity of the neighboring base station 2, 3 and/or an E-UTRAN Cell Global Identifier of the neighboring base station 2, 3. The controller 54 may for example be arranged to retrieve such information from a memory and to transmit the information by means of the output device 50.

In an embodiment, the base station 2, 3 is arranged to provide 41 the gateway identification information by receiving from the access node 4 a request for the gateway identification information, and transmitting to the access node 4 a response comprising the requested gateway identification information (refer also to FIG. 3 and related description). The gateway identification information may be transmitted in various kinds of messages, for example in an X2 set-up response.

In an embodiment, the base station 2, 3 is arranged to broadcast the gateway identification information as part of system information.

Figure 14:
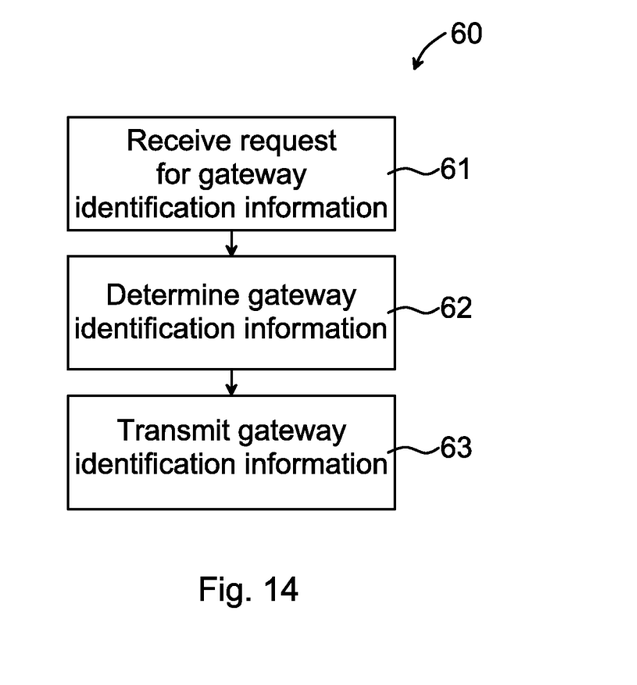
FIG. 14 illustrates a flow chart over steps of an embodiment of a method.

In an aspect, and with reference to FIG. 14, there is also provided a method 60 performed in a user equipment 5 of a communication system 1 for enabling the assigning of a gateway 6 to an access node 4 of the communication system 1. The communication system 1 comprises a core network node 7 and one or more neighboring base stations 2 to the access node 4. The method 60 comprises receiving 61 from the access node 4 a request for gateway identification information, the gateway identification information identifying a gateway 6 used by a neighboring base station 2, 3 to the access node 4. The method 60 further comprises determining 62 gateway identification information of a gateway 6 used by the neighboring base station 2, 3 to the access node 4, and transmitting 63 the determined gateway identification information to the access node 4, for enabling the core network node 7 to assign the gateway 6 to the access node 4.

Figure 15:
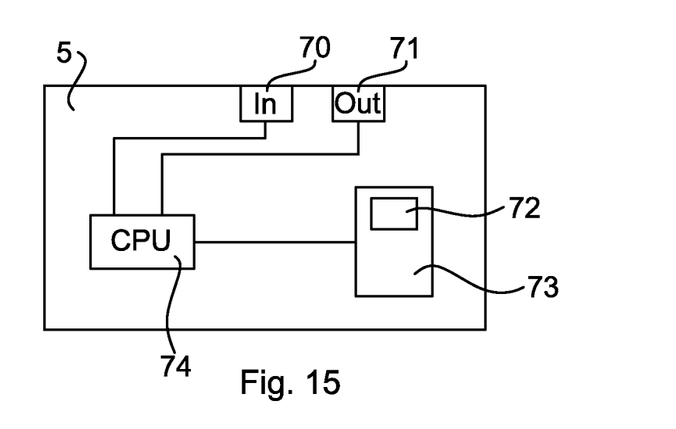
FIG. 15 illustrates an exemplifying user equipment suitable for implementing embodiments of the methods.

In an aspect, and with reference to FIG. 15, a user equipment 5 of a communication system 1 is also provided comprising an access node 4 and a gateway 6, the user equipment 5 comprising a controller 74, an input device 70 and an output device 71. The controller 74 may comprise a processor, e.g. a central processing unit, microcontroller, digital signal processor (DSP), etc., capable of executing software instructions stored in a computer program product. The user equipment 5 is arranged to receive, e.g. by means of the input device 70, from the access node 4 a request for gateway identification information, the gateway identification information identifying a gateway 6 used by a neighboring base station 2, 3 to the access node 4. The user equipment 5 is further arranged to determine gateway identification information of a gateway 6 used by the neighboring base station 2, 3 to the access node 4, and to transmit, e.g. by means of the output device 71, the determined gateway identification information to the access node 4, for enabling the core network node 7 to assign the gateway 6 to the access node 4.

The described methods and algorithms or parts thereof for enabling assigning a gateway to the access node 4 may be implemented e.g. by software and/or application specific integrated circuits in a processor. To this end, with reference again to FIG. 11, the access node 4 may further comprise a computer program 32 stored on a computer program product 33. The computer program 32 comprises computer program code, which, when run on the access node 4 (e.g. the controller 34 thereof) causes the access node 4 to perform the steps of the methods as described. Also encompassed is a computer program product 33 comprising a computer program 32 as described, and a computer readable means on which the computer program 32 is stored. The computer program product 33 can be any combination of read and write memory (RAM) or read only memory (ROM). The computer program product 33 may also comprise persistent storage, which, for example can be any single one or combination of magnetic memory, optical memory, or solid state memory.

Likewise, and with reference again to FIG. 13, the base station 2, 3 may comprise a computer program 52 stored on a computer program product 53. A computer program 52 for a base station 2, 3 as described is also encompassed. The computer program 52 comprises computer program code, which, when run on the base station 2, 3 (e.g. the controller 54 thereof) causes the base station 2, 3 to perform the steps of the methods as described. Also encompassed is the computer program product 53 comprising a computer program 52 as described above, and a computer readable means on which the computer program 52 is stored. The computer program product 53 can be any combination of read and write memory (RAM) or read only memory (ROM). The computer program product 53 may also comprise persistent storage, which, for example can be any single one or combination of magnetic memory, optical memory, or solid state memory.

Likewise, and with reference again to FIG. 15, the user equipment 5 may comprise a computer program stored on a computer program product 73. A computer program 72 for a user equipment 5 as described is also encompassed. The computer program 72 comprises computer program code, which, when run on the user equipment 5 causes the user equipment 5 to perform the steps of the methods as described. With reference still to FIG. 15, also encompassed is the computer program product 73 comprising the computer program 72 as described, and a computer readable means on which the computer program 72 is stored. The computer program product 73 can be any combination of read and write memory (RAM) or read only memory (ROM). The computer program product 73 may also comprise persistent storage, which, for example can be any single one or combination of magnetic memory, optical memory, or solid state memory.

The invention claimed is:

1. A method, in an access node of a communication system, for enabling assignment of a gateway to the access node, wherein the communication system comprises a core network node, the access node, and at least one neighboring base station of the access node, the method comprising:
   acquiring gateway identification information from the at least one neighboring base station, wherein the gateway identification information acquired from the at least one neighboring base station, identifies a gateway used by the at least one neighboring base station, wherein the acquiring gateway identification information comprises receiving information about the at least one neighboring base station from the at least one neighboring base station, the information about the at least one neighboring base station enabling the core network node to assign the gateway to the access node;
   transmitting the acquired gateway identification information to the core network node, in order to enable the core network node to assign the gateway to the access node.

2. The method of claim 1, wherein the acquiring gateway identification information comprises:
   transmitting a request for communication channel establishment to the at least one neighboring base station; and
   receiving the gateway identification information in a communication channel establishment response.

3. The method of claim 1, wherein the acquiring gateway identification information comprises acquiring the gateway identification information from the at least one neighboring base station via the core network node.

4. The method of claim 3, wherein the acquiring gateway identification information comprises receiving the gateway identification information from the core network node in a radio access network transparent container as part of a handover preparation.

5. The method of claim 1, wherein the acquiring gateway identification information comprises receiving the gateway identification information over an air interface from the neighboring base station.

6. The method of claim 1, wherein the acquiring gateway identification information comprises:
   transmitting a request for the gateway identification information to a user equipment;
   receiving a report comprising the gateway identification information from the user equipment.

7. The method of claim 1, wherein the gateway identification information comprises at least one of:
   a gateway address;
   a gateway identity;
   an IP-address of the gateway; and
   an identity of the neighboring base station;
   a tracking area identity of the neighboring base station; and
   an E-UTRAN Cell Global Identifier of the neighboring base station.

8. The method of claim 1, further comprising:
   receiving a confirmation message about the assigned gateway from the core network node.

9. An access node of a communication system, the communication system comprising a core network node, the access node, and at least one neighboring base station of the access node, the access node comprising:
   one or more processing circuits configured to:
   acquire gateway identification information from the at least one neighboring base station, wherein the gateway identification information acquired from the at least one neighboring base station, identifies a gateway used by the at least one neighboring base station; and
   transmit the acquired gateway identification information to the core network node, in order to enable the core network node to assign a gateway to the access node, wherein the one or more processing circuits are configured to acquire the gateway identification information by receiving information about the at least one neighboring base station from the at least one neighboring base station, the information about the at least one neighboring base station enabling the core network node to assign the gateway to the access node.

10. The access node of claim 9, wherein the one or more processing circuits are configured to acquire the gateway identification information by:
    transmitting a request for communication channel establishment to the neighboring base station;
    receiving the gateway identification information in a communication channel establishment response.

11. The access node of claim 9, wherein the one or more processing circuits are configured to acquire the gateway identification information from the neighboring base station via the core network node.

12. The access node of claim 11, wherein the one or more processing circuits are configured to acquire the gateway identification information by receiving the gateway identification information from the core network node in a radio access network transparent container as part of a handover preparation.

13. The access node of claim 9, wherein the one or more processing circuits are configured to acquire the gateway identification information by receiving the gateway identification information over an air interface from the neighboring base station.

14. The access node of claim 9, wherein the one or more processing circuits are configured to acquire the gateway identification information by:
    transmitting a request for the gateway identification information to a user equipment;
    receiving a report comprising the requested gateway identification information from the user equipment.

15. The access node of claim 9, wherein the one or more processing circuits are configured to acquire the gateway identification information that comprises at least one of:
    a gateway address;
    a gateway identity;
    an IP-address of the gateway;
    an identity of the neighboring base station;
    a tracking area identity of the neighboring base station; and an E-UTRAN Cell Global Identifier of the neighboring base station.

16. The access node of claim 9, wherein the one or more processing circuits are configured to receive a confirmation message about the assigned gateway from the core network node.

17. The access node of claim 9, wherein the one or more processing circuits comprise one or more low power interface circuits providing access to the communication system for a user equipment.

18. The access node of claim 9, wherein the one or more processing circuits are configured to transmit the acquired gateway identification information to the core network node by transmitting the acquired gateway identification information to a mobility management entity or a Serving General Packet Radio Service Support Node.

19. A method, in a base station of a communication system, for enabling assignment of a gateway to an access node, the method comprising:
    determining gateway identification information identifying the gateway for use by the access node, wherein the gateway identification information identifies a gateway used by the base station, the gateway identification information enabling a core network node to assign the gateway to the access node; and
    providing the gateway identification information, determined by the base station, to the access node, wherein the access node is configured to transmit the gateway identification information to the core network node for enabling the assignment of the gateway to the access node, wherein the gateway identification information is provided from the core network node in a radio access network transparent container as part of a handover preparation.

20. The method of claim 19, wherein the determining of gateway identification information comprises determining at least one of:
    a gateway address;
    a gateway identity;
    an IP-address of the gateway;
    an identity of the base station;
    a tracking area identity of the base station; and
    an E-UTRAN Cell Global Identifier of the base station.

21. The method of claim 19, wherein the providing of gateway identification information comprises:
    receiving a request for the gateway identification information from the access node;
    transmitting a response comprising the requested gateway identification information to the access node.

22. The method of claim 19, wherein the gateway identification information is broadcast as part of system information.

23. A base station of a communication system comprising an access node and a gateway, the base station comprising:
    a memory having instructions stored thereon executed by a processor to perform steps of:
    determining gateway identification information identifying a gateway for use by the access node, wherein the gateway identification information identifies the gateway used by the base station, the gateway identification information enabling a core network node to assign the gateway to the access node; and
    providing the gateway identification information, determined by the base station, to the access node, wherein the access node is configured to transmit the gateway identification information to the core network node for enabling the assignment of the gateway to the access node, wherein the gateway identification information is provided from the core network node in a radio access network transparent container as part of a handover preparation.

24. The base station of claim 23:
    wherein the instructions are executed by the processor to perform the step of determining the gateway identification information that comprises at least one of:
    a gateway address;
    a gateway identity;
    an IP-address of the gateway;
    an identity of the neighboring base station;
    a tracking area identity of the neighboring base station; and
    an E-UTRAN Cell Global Identifier of the neighboring base station.

25. The base station of claim 23, wherein the instructions are executed by the processor to perform the step of providing the gateway identification information by:
    receiving a request for the gateway identification information from the access node; and
    transmitting a response comprising the requested gateway identification information to the access node.

26. The method of claim 23, wherein the instructions are executed by the processor to perform the step of broadcasting the gateway identification information as part of system information.

27. A method, performed in a user equipment of a communication system, for enabling assignment of a gateway to an access node of the communication system, the communication system comprising a core network node and at least one neighboring base station of the access node, the method comprising:
    receiving a request for gateway identification information from the access node, the gateway identification information identifying a gateway used by the at least one neighboring base station, wherein the access node receives the gateway identification information from the at least one neighboring base station, wherein the gateway identification information enables the core network node to assign the gateway to the access node;
    determining gateway identification information of the gateway used by the neighboring base station; and
    transmitting the determined gateway identification information of the gateway used by the neighboring base station, to the access node, in order to enable the core network node to assign the gateway to the access node.

28. A user equipment of a communication system comprising an access node and a gateway, the user equipment comprising:
    a memory having instructions stored thereon executed by a processor to perform the steps of:
    receiving a request for gateway identification information from the access node, the gateway identification information identifying a gateway used by a neighboring base station of the access node, wherein the access node receives the gateway identification information from the at least one neighboring base station, wherein the gateway identification information enables a core network node to assign the gateway to the access node; and
    determining gateway identification information of the gateway used by the neighboring base station,
    wherein the gateway identification information of the gateway used by the neighboring base station, is transmitted to the access node, in order to enable the core network node to assign the gateway to the access node.

* * * * *